(12) United States Patent
Yi et al.

(10) Patent No.: US 7,630,012 B2
(45) Date of Patent: Dec. 8, 2009

(54) CAMERA MODULE HAVING AN ADSORBING COMPONENT AND RELATED METHOD THEREOF

(75) Inventors: Alan Yi, Guangxi (CN); Guan-Ying Li, Guangdong (CN)

(73) Assignee: Lite-On Technology Corp., Taipei (TW)

( * ) Notice: Subject to any disclaimer, the term of this patent is extended or adjusted under 35 U.S.C. 154(b) by 473 days.

(21) Appl. No.: 11/466,441

(22) Filed: Aug. 22, 2006

(65) Prior Publication Data

US 2007/0268395 A1    Nov. 22, 2007

(30) Foreign Application Priority Data

May 10, 2006    (CN) .................... 2006 1 0081727

(51) Int. Cl.
*H04N 5/225* (2006.01)
(52) U.S. Cl. ...................... 348/340; 359/811
(58) Field of Classification Search .......... 348/373, 348/374, 340, 335; 396/89
See application file for complete search history.

(56) References Cited

U.S. PATENT DOCUMENTS

| 5,838,495 | A  | * | 11/1998 | Hennick ............... 359/507 |
| 7,391,466 | B2 | * | 6/2008  | Machida .............. 348/374 |
| 7,460,317 | B2 | * | 12/2008 | Webster et al. ......... 359/811 |
| 2005/0248684 | A1 | * | 11/2005 | Machida .............. 348/373 |
| 2005/0264677 | A1 | * | 12/2005 | Uchida ............... 348/340 |

FOREIGN PATENT DOCUMENTS

| CN | 2694298 Y    | 4/2005 |
| CN | 2731479 Y    | 10/2005 |
| JP | P2005-316127 A | 11/2005 |

* cited by examiner

*Primary Examiner*—David L Ometz
*Assistant Examiner*—Ahmed A Berhan
(74) *Attorney, Agent, or Firm*—Rosenberg, Klein & Lee (57) ABSTRACT

A camera module is disclosed. The camera module includes a lens set, a holder, and an adsorbing component. The holder includes a mounting surface for fixing the lens set. The adsorbing component is positioned below the mounting surface for adsorbing at least a movable object.

24 Claims, 6 Drawing Sheets

CAMERA MODULE HAVING AN ADSORBING COMPONENT AND RELATED METHOD THEREOF

BACKGROUND OF THE INVENTION

1. Field of the Invention

The present invention relates to a camera module, and more particularly, to a camera module having an adsorbing component for adsorbing particles, and a related method thereof.

2. Description of the Prior Art

Figure 1:
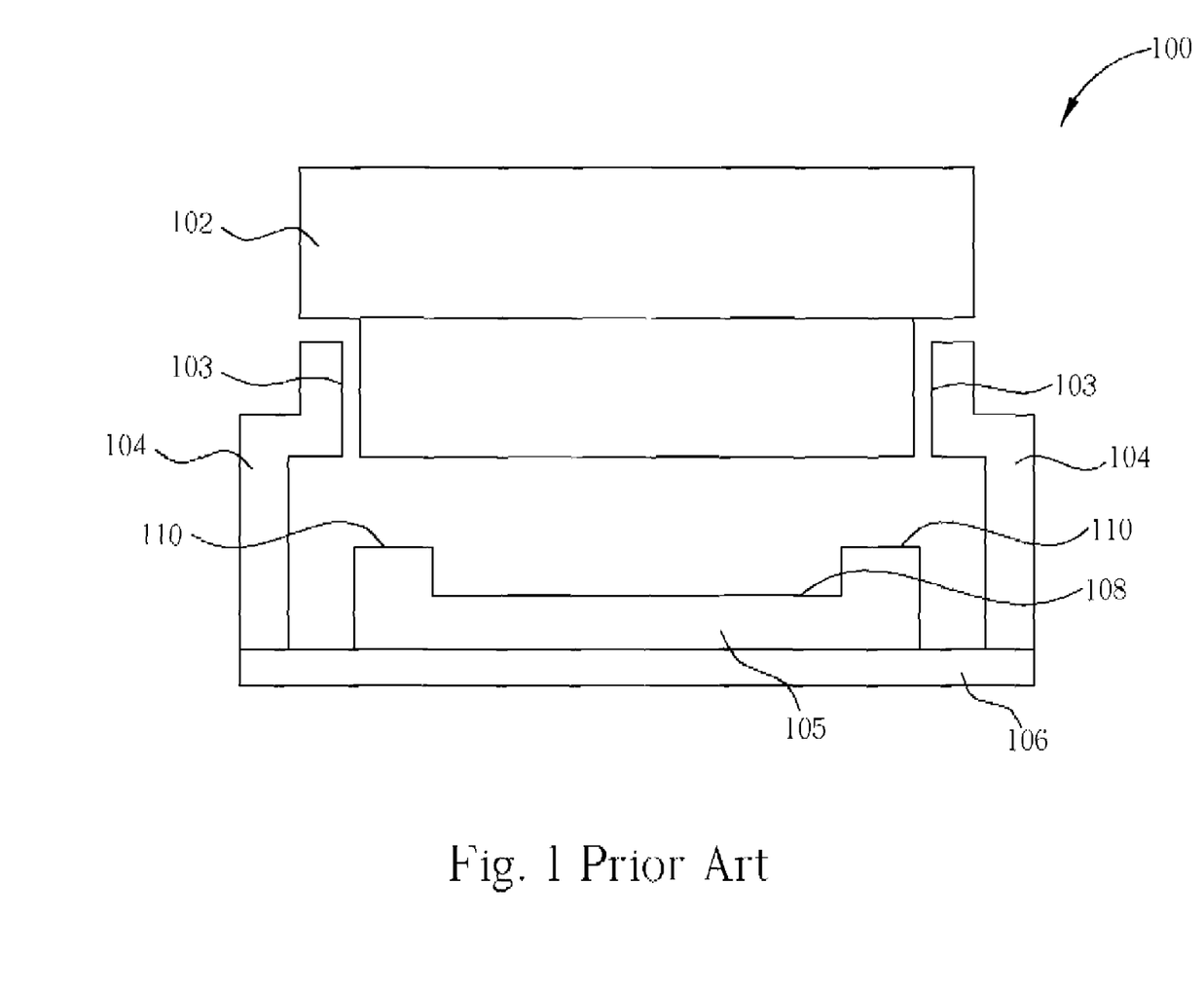
FIG. 1 is a section view diagram of a prior art camera module.

In general, after the fabrication of a camera module is accomplished, particles cannot be prevented from falling on a sensing area in the camera module, especially when utilized by an end user. Therefore, when producing an image, spots may occur in the image through the sensing area, and the quality of the image will be degraded. According to the prior art, when fabricating the camera module, the sensor module and components where particles usually originate in the camera module are cleared repeatedly to prevent spots from occurring as much as possible; however, particles originating after clearing or in assembly cannot be thus controlled. Please refer to FIG. 1. FIG. 1 is a section view diagram of a prior art camera module 100. As shown in FIG. 1, the camera module 100 comprises a lens set 102, a holder 104, a sensor module 105 and a printed circuit board (PCB) 106, wherein the sensor module 105 comprises a sensing area 108 and a non-sensing area 110. As mentioned above, the prior art camera module 100 is only cleared repeatedly in the fabrication phase, but it is not cleared in the assembly phase or after the assembly phase. Therefore, once particles occur in the sensor module 105 in the assembly phase or after the assembly phase, the sensing area 108 in the sensor module 105 will be influenced and the quality of the image will be degraded. In general, after the camera module is cleared and assembled, the main reasons for particles occurring again within the camera module 100 are the following: the mounting surface 103 on the holder 104 for fixing the lens set 102 is rubbed against the lens set 102 to adjust the focal distance, and objects on the PCB 106, for example rosins, fiberboards, and light pipe integrators, may result in particles. Therefore, under the above-mentioned condition, in order to let the camera modules be suitable for end users in a situation where camera modules cannot be manually dissembled, providing an effective scheme to prevent particles from degrading the quality of the image is of great importance.

SUMMARY OF THE INVENTION

Therefore one of the objectives of the present invention is to provide a camera module having an adsorbing component for adsorbing particles, and a related method to solve the above-mentioned problem.

According to the claimed invention, a first embodiment of a camera module is disclosed. The camera module comprises a lens set, a holder, and an adsorbing component. The holder comprises a mounting surface, wherein the mounting surface is utilized for fixing the lens set. The adsorbing component is positioned below the mounting surface, and the adsorbing component is utilized for adsorbing at least a movable object.

According to the claimed invention, a second embodiment of a camera module is disclosed. The camera module comprises a lens set, a sensor module, and an adsorbing component. The sensor module is positioned below the lens set and the sensor module comprises a sensing area and a non-sensing area, wherein the sensing area is utilized for sensing the light collected by the lens set. The adsorbing component is positioned above the non-sensing area and is utilized for adsorbing at least a movable object.

According to the claimed invention, a first method for adsorbing at least a movable object in a camera module is disclosed. The camera module comprises a lens set and a holder, wherein the holder comprises a mounting surface that is utilized for fixing the lens set. The method comprises: providing an adsorbing component; and positioning the adsorbing component below the mounting surface and utilizing the adsorbing component to adsorb the movable object.

According to the claimed invention, a second method for adsorbing at least a movable object in a camera module is disclosed. The camera module comprises a lens set and a sensor module, wherein the sensor module is positioned below the lens set and comprises a sensing area and a non-sensing area, wherein the sensing area is utilized for sensing the light collected by the lens set. The method comprises: providing an adsorbing component; and positioning the adsorbing component above the non-sensing area and utilizing the adsorbing component to adsorb the movable object.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
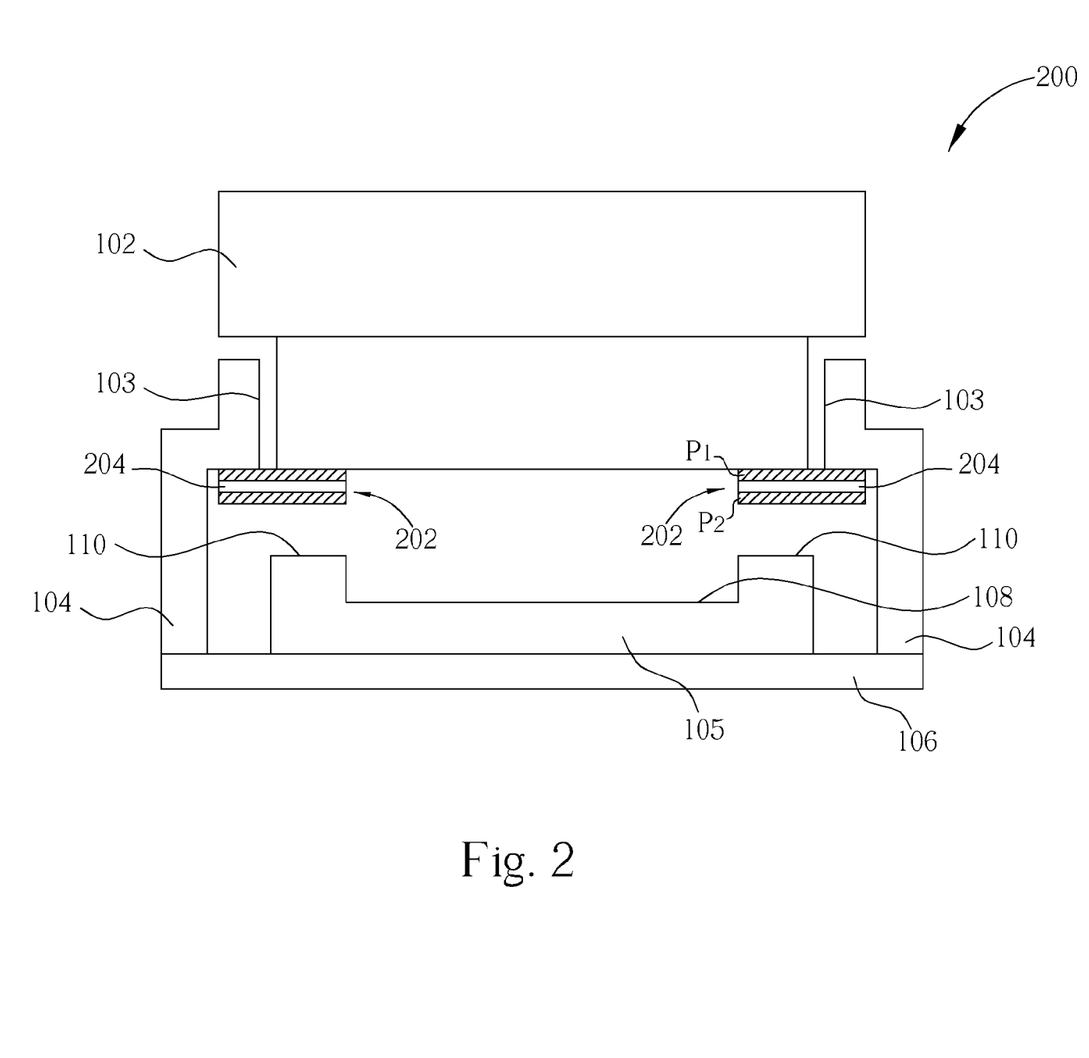
FIG. 2 is a section view diagram of a camera module according to a first embodiment of the present invention.

Please refer to FIG. 2. FIG. 2 is a section view diagram of a camera module 200 according to a first embodiment of the present invention. As shown in FIG. 2, the camera module 200 comprises a lens set 102, a holder 104, a sensor module 105, a PCB 106, and an adsorbing component 202, wherein the sensor module 105 comprises a sensing area 108 and a non-sensing area 110. Except for the adsorbing component 202, other elements shown in FIG. 2 are identical to those shown in FIG. 1 and further description is therefore not provided. In this embodiment, the adsorbing component 202 is set up directly below the mounting surface 103 on the holder 104 in a vertical direction and is utilized for adsorbing at least movable objects (for example, particles) occurring within the camera module 200; the adsorbing component 202 is placed in an inner space of the camera module 200 and includes an upper plane $P_1$ and an under plane $P_2$ which are respectively perpendicular to the mounting surface 103. Further, the adsorbing component 202 is mainly utilized for adsorbing particles resulting from the friction between the lens set 102 and the mounting surface 103 on the holder 104 when adjusting the focal distance. In practice, of course, the adsorbing component 202 can also adsorb particles that are generated randomly. As known to those skilled in the art, the lens set 102 and the holder 104 are combined in a rotational way. For instance, threads on the surfaces of the lens set 102 and the holder 104 are matched to engage with each other, and by fixing the holder 104, the lens set 102 can be turned to adjust the focal distance. In order to not adversely influence the objectives of the present invention, however, the mounting surface 103 is simply represented as a plane surface. In this embodiment, the adsorbing component 202 includes a Mylar piece 204, wherein an upper plane of the Mylar piece 204 (represented in oblique lines) is smeared on a first adherent substance and an under plane of the Mylar piece 204 (represented in oblique lines) is smeared on a second adherent substance. Particles generated by the friction from the mounting surface 103 on the holder 104 and the lens set 102 that fall on the upper plane will be adhered to the first adherent substance because of their weight such that they cannot move to the sensing area 108. Therefore, the quality of the image is improved. In other words, a part of the upper plane $P_1$ of the adsorbing component 202 adheres to the inside of the holder 104 directly; this enables the mounting surface 103 on the holder 104 and an inner room of the camera module 200 to be separated by the adsorbing component 202. Particles falling from the mounting surface 103 are separated and the quality of the image will not be influenced because the majority of particles will not fall on the sensing area 108. Furthermore, the second adherent substance on the under plane of the Mylar piece 204 can be used as an auxiliary for adsorbing particles generated randomly by the camera module 200 in practice. For example, there may be an opportunity for particles caused by the PCB to be adhered to the under plane $P_2$ of the adsorbing component 202. In this embodiment, both the first and second adherent substances are the same adherent substance, for example, acrylic acid. However, different adherent substances are also suitable for the present invention. That is to say, it is not a limitation of the present invention for the upper and under planes of the Mylar 204 to be smeared with the same adherent substance. Additionally, the function of adsorbing particles is also achieved by the adsorbing component 202 that utilizes a non-adherent substance (e.g. a magnetic substance or an electrostatic substance). This also obeys the spirit of the present invention.

Figure 3:
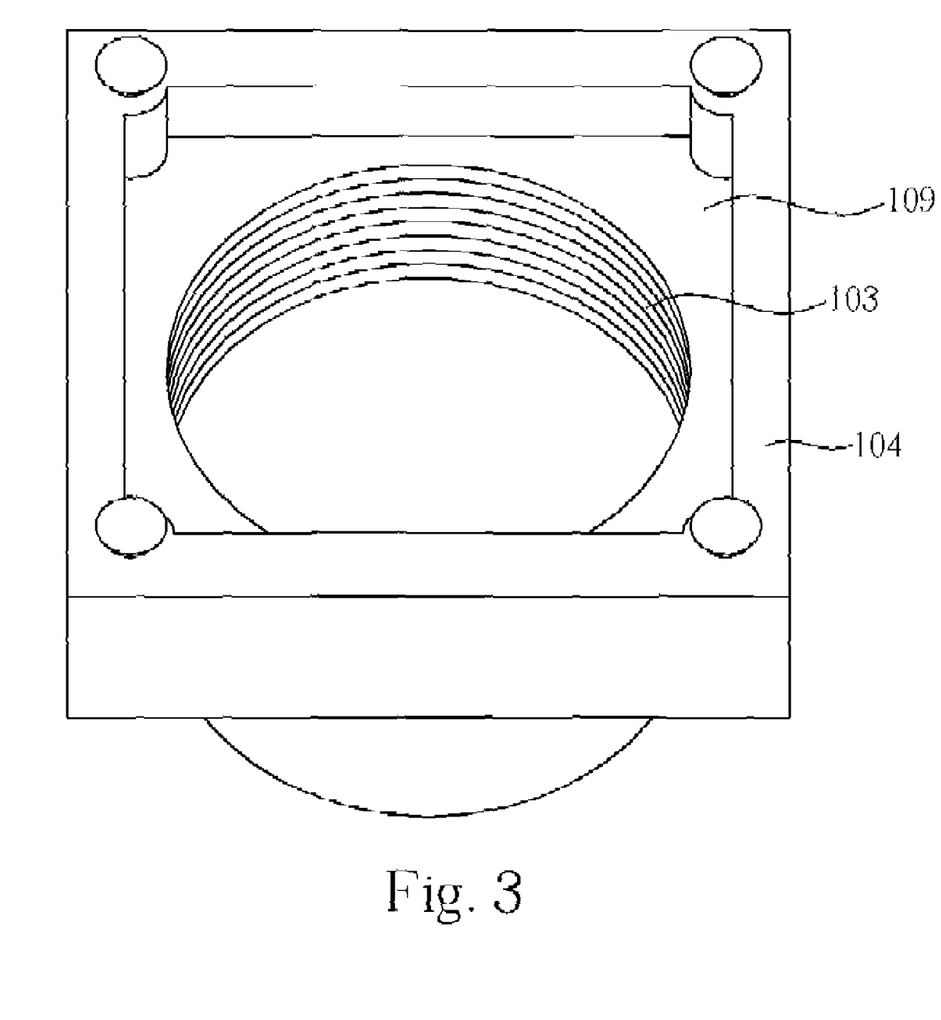
FIG. 3 is a diagram of a holder shown in FIG. 2.
Figure 4:
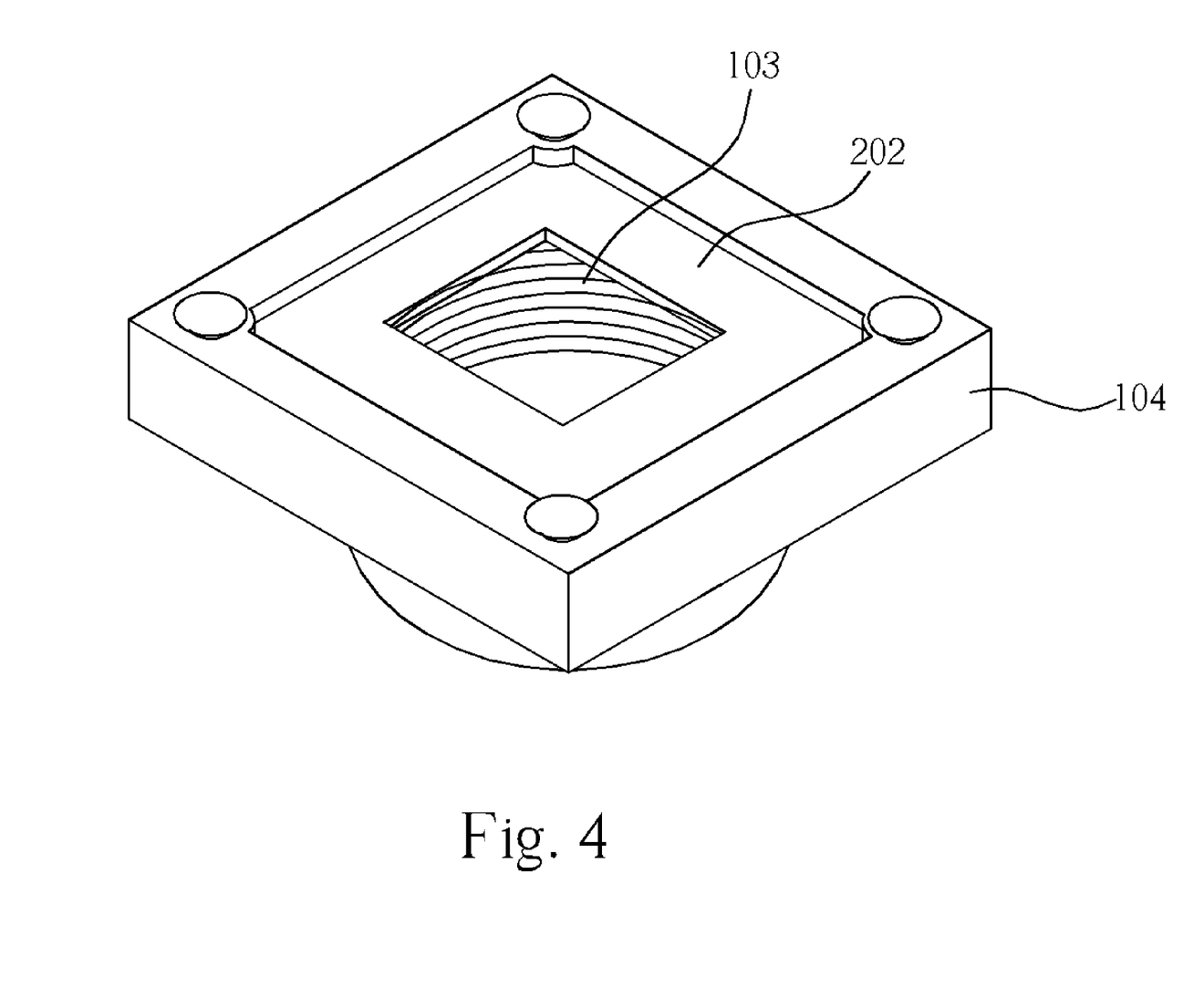
FIG. 4 is a diagram of an adsorbing component being set up inside a holder shown in FIG. 3.

Please refer to FIG. 3 and FIG. 4. FIG. 3 is a diagram of a holder 104 shown in FIG. 2. FIG. 4 is a diagram of an adsorbing component 202 being set up inside a holder 104 shown in FIG. 3. As shown in FIG. 3, an internal platform of the holder 104 (i.e. 109) is utilized for fixing the adsorbing component 202. When fabricating the camera module 200, the upper plane of the adsorbing component 202 is pasted up on the internal platform 109 (as shown in FIG. 4) and the lens set 102 is then fabricated into the holder 104. Therefore, the goal of adsorbing particles occurring due to friction between the mounting surface 103 of the holder 104 and the lens set 102 can be achieved.

Figure 5:
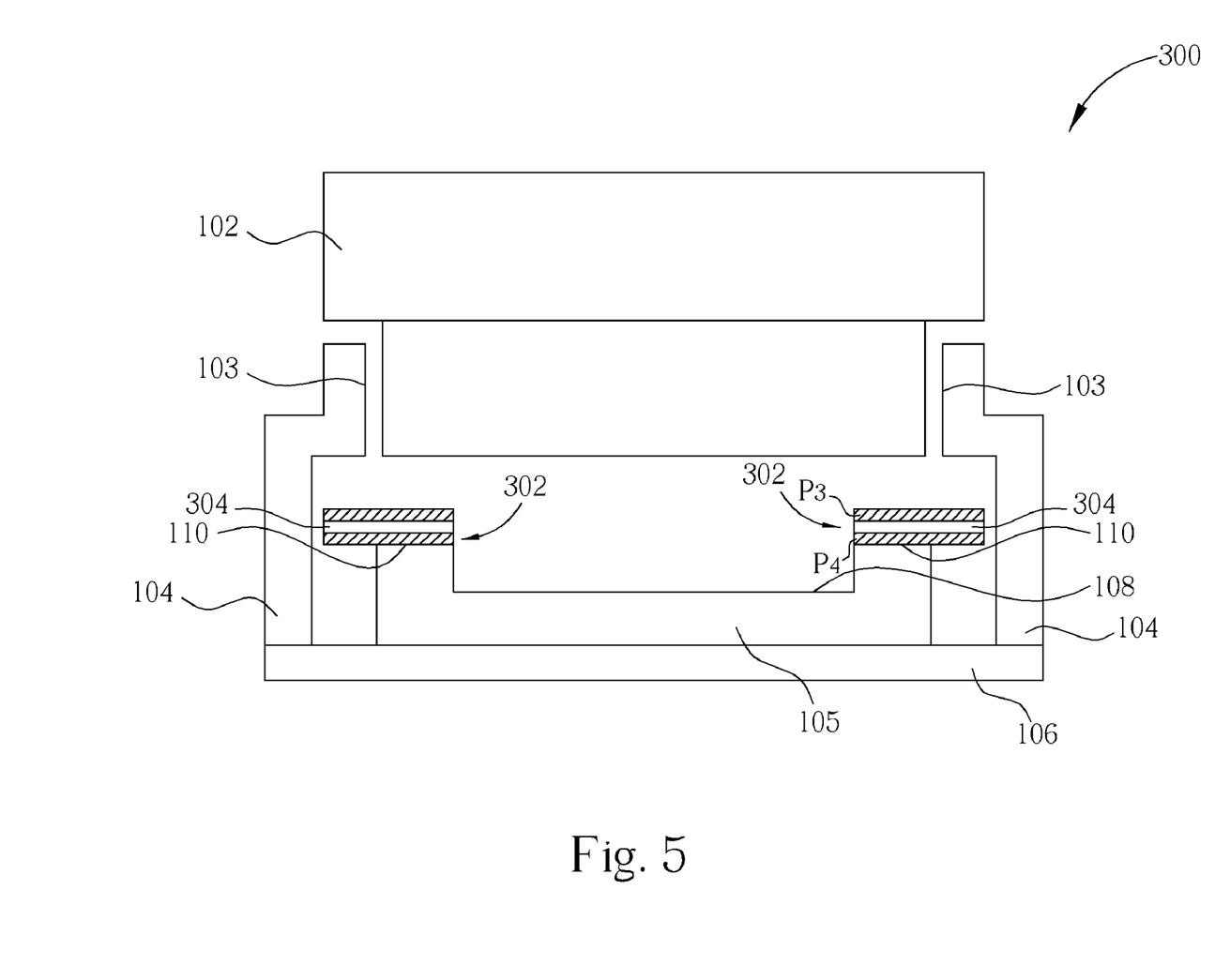
FIG. 5 is a section view diagram of a camera module according to a second embodiment of the present invention.

Please refer to FIG. 5. FIG. 5 is a section view diagram of a camera module 300 according to a second embodiment of the present invention. As shown in FIG. 5, except for the adsorbing component 302, other elements are all identical to those shown in FIG. 1. Further description is not detailed. The adsorbing component 302 comprises a Mylar piece 304, wherein an under plane $P_4$ of the adsorbing component 302 (represented in oblique lines) is smeared on the second adherent substance and a part of the under plane adheres to the non-sensing area 110 directly. Therefore, another part of the under plane not adhering to the non-sensing area 110 can be utilized for adsorbing particles. In this way, movable objects (e.g. particles), resulting from rosins, fiberboards, and light pipe integrators on the PCB 106 or other factors etc. can be adhered by the second adherent substance. The sensing area 108 prevents particles generated from the PCB 106 from influencing the image in order to improve the quality of the image. Additionally, the upper plane of the Mylar 304 of the adsorbing component 302 is also smeared on a first adherent substance (represented in oblique lines). This allows an opportunity for particles resulting from the mounting surface 103 on the holder 104 to be adsorbed to the upper plane $p_3$ of the adsorbing component 302, and the effect of particles falling from the mounting surface 103 on the holder 104 influencing the sensing area 108 can thereby be decreased. Similarly, in this embodiment, both the first and second adherent substances are the same adherent substance, for example, acrylic acid. However, different adherent substances are suitable for the present invention. That is to say, it is not a limitation of the present invention for the upper and under planes of the Mylar 304 to be smeared with the same adherent substance. Additionally, the function of adsorbing particles is achieved by the adsorbing component 302 that utilizes a non-adherent substance (e.g. a magnetic substance or an electrostatic substance). This also obeys the spirit of the present invention.

Figure 6:
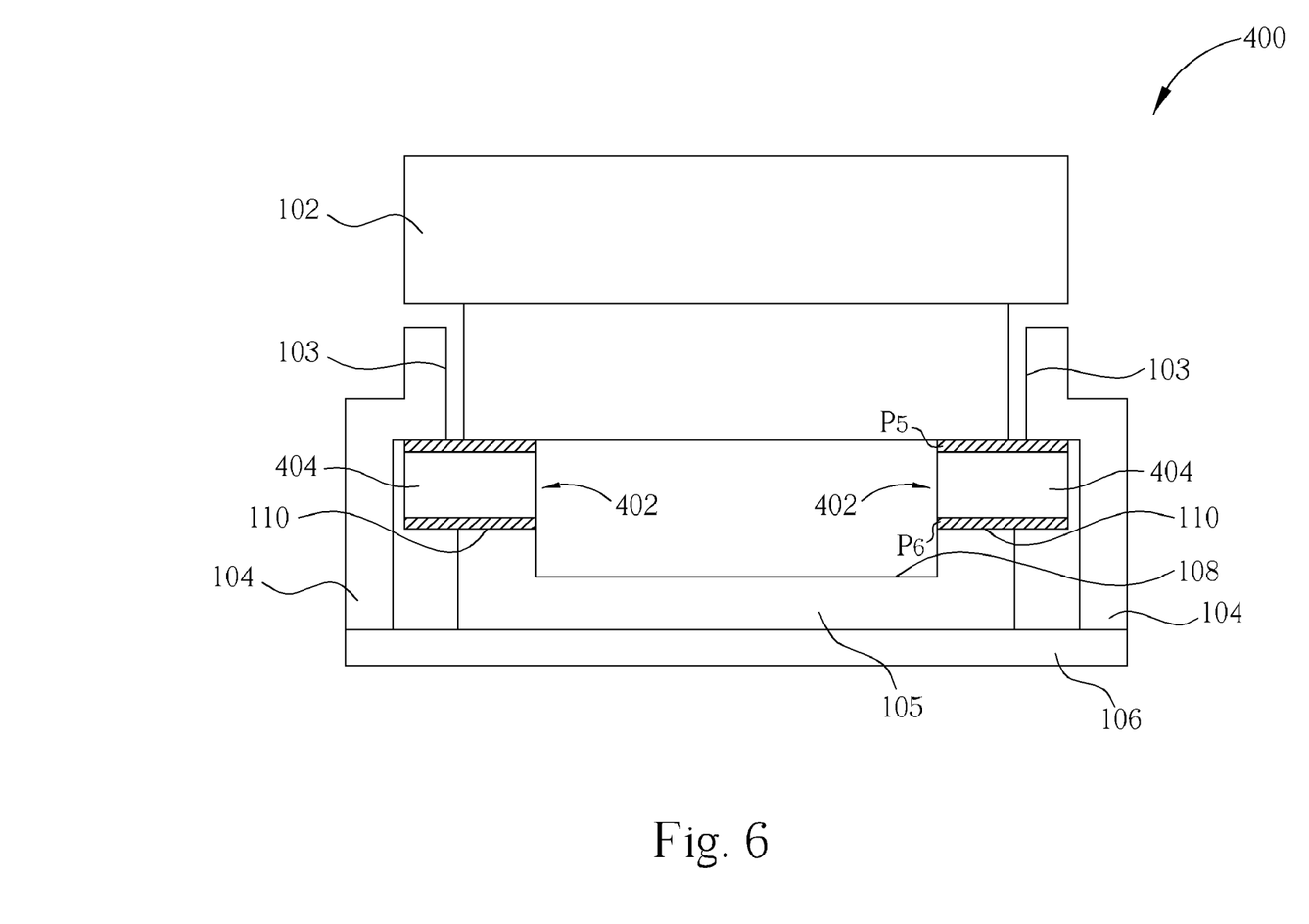
FIG. 6 is a section view diagram of a camera module according to a third embodiment of the present invention.

Please refer to FIG. 6. FIG. 6 is a section view diagram of a camera module 400 according to a third embodiment of the present invention. As shown in FIG. 6, except for the camera module 402, other elements are all identical to those shown in FIG. 1. Further description is therefore not explained. The adsorbing component 402 comprises a Mylar piece 404, wherein the upper plane and under plane of the Mylar piece 404 are smeared on a first adherent substance (represented in oblique lines) and a second adherent substance (represented in oblique lines) respectively. The upper plane of the Mylar piece 404 is utilized for adsorbing movable objects (e.g. particles) generated from the friction between the mounting surface 103 of the holder 104 and the lens set 102 when adjusting the focal distance, and the under plane of the Mylar piece 404 is utilized for adsorbing movable objects (e.g. particles) generated from the PCB 106. Parts of the upper plane $P_5$ and under plane $P_6$ directly contact to the inside of the holder 104 and the non-sensing area 110 respectively. That is to say, a portion of the under plane $P_6$ of the adsorbing component 402 is positioned above the non-sensing area 110 and below the mounting surface 103 in a vertical direction.

The sensing area 108 is sealed up due to the adsorbing component 402. As compared to the first and second embodiments, this embodiment is able to separate particles and the sensing area 108 more effectively such that the sensing area 108 is almost uninfluenced by particles. Therefore, the quality of the image can be improved greatly. In this embodiment, both the first and second adherent substances are the same adherent substance, for example, acrylic acid. However, different adherent substances are suitable for the present invention. That is to say, it is not a limitation of the present invention for the upper and under planes of the Mylar 404 to be smeared with the same adherent substance. Additionally, adsorbing particles is achieved by the adsorbing component 402 that utilizes a non-adherent substance (e.g. a magnetic substance or an electrostatic substance). This also obeys the spirit of the present invention. Please note that, in the third embodiment, the fabrication phase of the adsorbing component 402 is shown in FIG. 3 and FIG. 4, and a main difference is that a thickness of the adsorbing component 402 is thicker than one of the adsorbing component 202.

Please note that, in above embodiments, the reason for using the Mylar piece is that a thickness of the Mylar piece can be designed by the manufacturer and the material for the Mylar piece itself will not incur ragged edges when shock cutting. For instance, in the third embodiment, the thickness of the adsorbing component 402 depends on the distance between the upper plane of the non-sensing area 110 and the holder 104. In the present invention, a requirement for the thickness of the adsorbing component 402 is that the thickness of the adsorbing component 402 must equal a value that enables the distance between the upper plane of the non-sensing area 110 and the holder 104 to decrease by 0.05 millimeters. Any modification of the thickness requirement of the adsorbing component 402 is not a limitation of the present invention. Further, because the thickness of the Mylar piece can be designed by the manufacturer, a situation where a particle falls on the adsorbing component 402 then falls on the sensing area 108 thereby negatively influencing the quality of the image will not happen even though the adherent substance on the surface of the Mylar piece 404 is not adhered. Additionally, the Mylar piece 404 will not result in burrs while shock cutting, i.e. the feature of the material of the Mylar piece 404 not producing particles can thereby avoid influencing the sensing area 108 after the adsorbing component 402 is fabricated. The Mylar piece 404 also performs well in hard and brittle materials tests, crystalline tests, heat resistance tests, and weather fastness tests. Therefore, the property of the Mylar piece 404 will not easily break down due to human behavior or factors relating to the material itself. In addition, in the above embodiments, colors of the adsorbing components 202, 302, and 402 are all black because black substances can be utilized for absorbing light to prevent the insides of the camera modules 200, 300, and 400 from being influenced by optical reflection.

Moreover, as can be seen from viewing FIG. 3 and FIG. 4, when designing the adsorbing components 202, 402, lengths, widths, and sizes of inner holes of the adsorbing components 202, 402 must be considered. The requirement for the lengths and widths of the adsorbing components 202, 402 is that the length and width of the adsorbing component must be smaller than the size of the inner of the holder 104 for good fabrication. The requirement for sizes of inner holes of the adsorbing components 202, 402 is that they do not block the sensing area 108, i.e. to prevent the adsorbing components 202, 402 themselves from influencing the operation of the sensing area 108. Additionally, any modifications of the shape of the adsorbing component that satisfy the above conditions all obey the spirit of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A camera module, comprising:
   a lens set;
   a holder, comprising a mounting surface, wherein the mounting surface is utilized for fixing the lens set; and
   an adsorbing component, positioned directly below the mounting surface in a vertical direction and placed in an inner space of the camera module, wherein the adsorbing component is utilized for adsorbing at least a movable object;
   wherein the adsorbing component includes an upper plane and an under plane which are respectively perpendicular to the mounting surface.

2. The camera module of claim 1, wherein a first adherent substance is smeared over the upper plane of the adsorbing component, and a portion of the upper plane is adhered directly to an inside of the holder.

3. The camera module of claim 2, wherein the adsorbing component comprises a Mylar piece, and the first adherent substance is smeared over an upper plane of the Mylar piece.

4. The camera module of claim 2, wherein a second adherent substance is smeared over the under plane of the adsorbing component.

5. The camera module of claim 4, wherein the adsorbing component comprises a Mylar piece, the first adherent substance is smeared over an upper plane of the Mylar piece, and the second adherent substance is smeared over an under plane of the Mylar piece.

6. The camera module of claim 2, wherein the portion of the upper plane of the adsorbing component is directly adhered to an internal platform of the holder.

7. The camera module of claim 2, further comprising:
   a sensor module, positioned below the lens set, the sensor module comprising a sensing area and a non-sensing area, wherein the sensing area is utilized for sensing the light collected by the lens set;
   wherein the under plane of the adsorbing component directly contacts to the non-sensing area to seal the sensing area.

8. The camera module of claim 7, wherein a second adherent substance is smeared over the under plane, and a portion of the under plane is adhered directly to the non-sensing area.

9. The camera module of claim 8, wherein the adsorbing component comprises a Mylar piece, and the first and second adherent substances are smeared over the upper and under planes respectively.

10. A camera module, comprising:
    a lens set;
    a holder, comprising a mounting surface, wherein the mounting surface is utilized for fixing the lens set;
    a sensor module, positioned in an inner space of the camera module and below the lens set, the sensor module comprising a sensing area and a non-sensing area, wherein the sensing area is utilized for sensing the light collected by the lens set; and
    an adsorbing component, comprising an upper plane and an under plane which are respectively perpendicular to the mounting surface, a portion of the under plane being positioned above the non-sensing area and directly below the mounting surface in a vertical direction, the adsorbing component being utilized for adsorbing at least a movable object.

11. The camera module of claim 10, wherein a second adherent substance is smeared over the under plane of the adsorbing component, and the portion of the under plane is adhered directly to the non-sensing area.

12. The camera module of claim 11, wherein the adsorbing component comprises a Mylar piece and the second adherent substance is smeared over an under plane of the Mylar piece.

13. The camera module of claim 11, wherein a first adherent substance is smeared over the upper plane of the adsorbing component.

14. The camera module of claim 13, wherein the adsorbing component comprises a Mylar piece, the first adherent substance is smeared over an upper plane of the Mylar piece and the second adherent substance is smeared over an under plane of the Mylar piece.

15. The camera module of claim 13, wherein the portion of the upper plane of the adsorbing component is directly adhered to an internal platform of the holder.

16. A method for adsorbing at least a movable object in a camera module, wherein the camera module comprises a lens set, a holder and a sensor module, the holder comprising a mounting surface for fixing the lens set, the sensor module being positioned below the lens set and comprising a sensing area and a non-sensing area, wherein the sensing area is utilized for sensing the light collected by the lens set, the method comprising:

provic an adsorbing component including an upper plane and an under plane which are respectively perpendicular to the mounting surface and placed in an inner space of the camera module; and positioning a portion of the under plane of the adsorbing component above the non-sensing area and directly below the mounting surface in a vertical direction, and utilizing the adsorbing component to adsorb at least the movable object.

17. The method of claim 16, wherein the step of providing the adsorbing component further comprises:

smearing a second adherent substance over the under plane of the adsorbing component; and the step of positioning the adsorbing component above the non-sensing area further comprises:

making the portion of the under plane adhere to the non-sensing area.

18. The method of claim 17, wherein the step of providing the adsorbing component further comprises:

smearing a first adherent substance over the upper plane of the adsorbing component.

19. A method for adsorbing at least a movable object in a camera module, the camera module including a lens set and a holder, the holder including a mounting surface for fixing the lens set, the method comprising:

providing an adsorbing component; and positioning the adsorbing component directly below the mounting surface in a vertical direction and placing the adsorbing component in an inner space of the camera module, and utilizing the adsorbing component to adsorb the movable object;

wherein the adsorbing component includes an upper plane and an under plane which are respectively perpendicular to the mounting surface.

20. The method of claim 19, wherein the step of providing the adsorbing component further comprises:

smearing a first adherent substance over the upper plane of the adsorbing component; and the step of positioning the adsorbing component directly below the mounting surface further comprises:

making a portion of the upper plane directly adhere to an inside of the holder.

21. The method of claim 20, wherein the step of making the portion of the upper plane directly adhere to the inside of the holder further comprises:

making the portion of the upper plane directly adhere an internal platform of the holder.

22. The method of claim 20, wherein the step of providing the adsorbing component further comprises:

smearing a second adherent substance over the under plane of the adsorbing component.

23. The method of claim 20, wherein the camera module further includes a sensor module positioned below the lens set, the sensor module including a sensing area and a non-sensing area, the sensing area being used for sensing light collected by the lens set, and the step of positioning the adsorbing component directly below the mounting surface further comprises:

making the under plane of the adsorbing component directly contact to the non-sensing area to seal the sensing area.

24. The method of claim 23, wherein the step of providing the adsorbing component further comprises:

smearing a second adherent substance over the under plane of the adsorbing component; and positioning the adsorbing component directly below the mounting surface further comprises:

making a portion of the under plane directly adhere to the non-sensing area.

* * * * *